United States Patent
Anderson et al.

(10) Patent No.: US 8,175,095 B2
(45) Date of Patent: May 8, 2012

(54) SYSTEMS AND METHODS FOR SENDING DATA PACKETS BETWEEN MULTIPLE FPGA DEVICES

(75) Inventors: Joshua D. Anderson, Garland, TX (US); Scott M. Burkart, Royse City, TX (US); Matthew P. DeLaquil, Rockwall, TX (US); Deepak Prasanna, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 171 days.

(21) Appl. No.: 12/340,094

(22) Filed: Dec. 19, 2008

(65) Prior Publication Data

US 2010/0157854 A1  Jun. 24, 2010

(51) Int. Cl.
   *H04L 12/56* (2006.01)
(52) U.S. Cl. ......................... 370/391; 370/252
(58) Field of Classification Search .......... 370/394, 370/342, 220, 252, 329, 474; 709/238; 710/311
   See application file for complete search history.

(56) References Cited

U.S. PATENT DOCUMENTS

| | | | |
|---|---|---|---|
| 7,500,046 B1 * | 3/2009 | Puri et al. ........................ | 710/311 |
| 2004/0160984 A1 * | 8/2004 | Sidhushayana et al. ...... | 370/474 |
| 2005/0256969 A1 * | 11/2005 | Yancey et al. ................. | 709/238 |
| 2007/0195747 A1 * | 8/2007 | Attar et al. .................... | 370/342 |
| 2007/0248023 A1 * | 10/2007 | Chui ............................. | 370/252 |
| 2008/0151514 A1 | 6/2008 | Yancey | |
| 2008/0205407 A1 * | 8/2008 | Chang et al. .................. | 370/394 |
| 2008/0263303 A1 | 10/2008 | Yancey et al. | |
| 2009/0154342 A1 * | 6/2009 | Oltman et al. ................. | 370/220 |
| 2009/0172052 A1 | 7/2009 | DeLaquil et al. | |
| 2010/0111004 A1 * | 5/2010 | Yi et al. ........................ | 370/329 |

\* cited by examiner

*Primary Examiner* — Kwang B Yao
*Assistant Examiner* — Syed M Bokhari
(74) *Attorney, Agent, or Firm* — Hovey Williams LLP (57) ABSTRACT

Application Specific Integrated Circuit ("ASIC") devices, such as Field Programmable Gate Arrays ("FPGAs"), may be interconnected using serial I/O connections, such as high speed multi-gigabit serial transceiver ("MGT") connections. For example, serial I/O connections may be employed to interconnect a pair of ASICs to create a high bandwidth, low signal count connection, and in a manner so that any given pair of multiple ASIC devices on a single circuit card may communicate with each other through no more than one serial data communication link connection step. A reconfigurable hardware architecture ("RHA") may be configured to include a communications infrastructure that uses a high-bandwidth packet router to establish standard communications protocols between multiple interfaces and/or multiple devices that may be present on a single circuit card. Dynamically-sized data packets, sized in accordance with the amount of data ready to be sent, are transferred between the devices and/or interfaces on the card.

22 Claims, 5 Drawing Sheets

SYSTEMS AND METHODS FOR SENDING DATA PACKETS BETWEEN MULTIPLE FPGA DEVICES

BACKGROUND

1. Field of Invention

Embodiments of the present invention relate to interconnection of multiple application specific integrated circuit (ASIC) devices such as Field Programmable Gate Array (FPGA) devices. More particularly, embodiments of the invention relate to data packet routing methods and systems for routing data between multiple ASIC devices.

2. Description of the Related Art

Reconfigurable ASICs such as FPGA devices are commonly used in signal processing applications, communications applications, interfacing applications, networking applications, and other environments that require and/or benefit from devices that can be user-configured after manufacture. It is common to interconnect multiple FPGA devices as an array on a single circuit card using point-to-point or bussed parallel wiring configurations. Such parallel wiring configurations use many wires, along with associated I/O Counts and termination components, to achieve required data transfer bandwidths, thus requiring the creation of many connection layers on a circuit card leading to undesirable outcomes such as a high degree of mechanical complexity, high cost, and RF interference. Examples of these parallel interfaces include those using signaling standards such as Gunning Transceiver Logic ("GTL"), Stub-Series Termination logic ("SSTL"), and High-Speed Transceiver Logic ("HSTL"). Some of these standards require as many as three termination components per signal to implement.

To alleviate some of the problems of parallel wiring configurations, methods and systems for interconnecting ASIC devices using simplex and/or duplex serial I/O connections, including high speed serial connections such as multi-gigabit serial transceiver ("MGT") connections have been developed. Such methods and systems achieve communication between given pairs of devices with relatively high data transfer bandwidths and minimal wiring. Furthermore, such methods and systems allow an ASIC card to be easily scalable to other cards to permit easy expansion of ASIC resources.

Circuits having multiple ASIC devices on a single card often require the transfer of large amounts of data between the devices. U.S. Pat. No. 7,444,454 discloses a novel packet router interface switch matric (PRISM) for efficiently routing data packets between multiple FPGA devices or within a single FPGA device. In a PRISM router and similar routers, data is typically sent in data packets of a fixed size. The data accumulates in registers until a sufficient amount of data needed to fill a packet arrives. Then, as soon as a packet can be filled, the packet is assembled and sent using the router.

The data packet creation process requires a certain amount of overhead time. For example, in addition to the time it takes to send a data packet, it may take an additional 25 clock cycles to prepare the packet. The overhead time is relatively constant regardless of the packet size. For example, it takes about the same amount of time to prepare a 100 word packet as a 10 word packet. Thus, it appears that the efficiency of a packet router can be increased by simply increasing the packet size.

Unfortunately, however, larger packet sizes create other problems. For example, while a router waits to receive enough data to fill a large data packet, the destination FPGA device or other device sits idle and wastes processing capabilities. Similarly, waiting for enough data to fill a large data packet may result in lost data. For example, an FPGA device may be configured to add two or more numbers and then send the sum to another FPGA device. The sending FPGA may finish its function and output 50 words of data, but the router may be configured to only route 100 word data packets. The 50 word output of the adder is then held until more is available, and may eventually become lost.

SUMMARY

The present invention solves at least some of the above-described problems and provides a distinct advance in the art of ASIC devices. More particularly, embodiments of the present invention provide improved methods of creating and routing data packets between ASIC devices that have PRISM routers or similar serially-configured routers.

Embodiments of the invention may be implemented with signal processing circuitry including two or more ASIC devices, wherein each one of the ASIC devices includes a packet router. The packet router of each ASIC device is coupled to each respective packet router of the other ASIC devices by a separate respective simplex or duplex data communication link so as to form a direct serial interconnection between each of the ASIC devices.

The invention may be implemented, for example, such that each embedded processor, processor node, card level-interface, user-defined hardware module, etc. is provided with access to each of the other such entities on a card through one or more separate respective "one step" data communication links that each includes no more than two respective serial connections coupled together (e.g. no more than two respective high speed serial connections coupled together) in the data communication path and through a minimum number of packet transfer points. In a further embodiment, such a respective data communication link may be further characterized as a "direct serial interconnection" between two such entities, meaning that no multi-port switch device (e.g. crossbar switch, etc.) exists in the serial data communication path between the boundaries of the two entities. Such circuitry achieves communication between given pairs of devices with relatively high data transfer bandwidths and minimal wiring. Furthermore, the present invention may be utilized (e.g. extended) to establish a communications infrastructure across multiple circuit cards.

In accordance with an important aspect of the invention, each of the packet routers may include or be in communication with a data packet creation system configured to prepare and send data packets that are dynamically sized based on the amount of available data to be sent. The data packet creation system does not require a pre-set amount of data to be sent with each packet, but instead creates differently sized packets for different situations.

An exemplary embodiment of the data packet creation system includes at least one data register, a word or data counter, and a packet creator. The data register may be a first-in-first-out (FIFO) register and may receive data from its ASIC or another ASIC. The word counter counts the amount of data in the data register and provides the count to the packet creator. The packet creator receives the data from the data register and the word count from the data counter, creates a data packet, and sends it to its destination. Importantly, the packet creator does not have to wait for a particular amount of data to create a data packet. Instead, as soon as the packet creator receives a signal from the router of a destination ASIC or other device that it is ready to receive data, the packet creator takes the current word count from the counter, adds it to a packet header, and then takes the words currently stored in the register and creates a data packet. The packet creator also interacts with the PRISM router by waiting for a data ready signal, transmitting data acknowledgments back to PRISM, and coordinating other timing and synchronization tasks.

Examples of ASIC devices that may be interconnected using the disclosed systems and methods include, but are not limited to, field Programmable Gate Arrays ("FPGAs") or other field programmable devices ("FPDs") or programmable logic devices ("PLDs"). In one embodiment of the practice of the disclosed systems and methods, serial I/O connections may be employed to interconnect a pair of ASICs to create a low signal count connection. For example, in one exemplary embodiment, high speed serial I/O connections (e.g. such as MGT connections) may be employed to interconnect a pair of ASICs to create a high bandwidth, low signal Count connection.

The disclosed systems and methods may be implemented in a variety of environments including, but not limited to, signal processing applications, communication applications, interfacing applications, networking applications, cognitive computing applications, test and measurement applications, etc. For example, the disclosed systems and methods may be implemented as part of a reconfigurable hardware architecture ("RHA"), such as a reconfigurable signal processing circuit, that serves as a consistent framework in which ASIC applications may be user-defined and/or deployed in such a way as to enhance code portability, design re-use, and intercommunication, as well as to support board-level simulations extending beyond and between individual ASIC boundaries.

These and other important aspects of the present invention are described more fully in the detailed description below.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
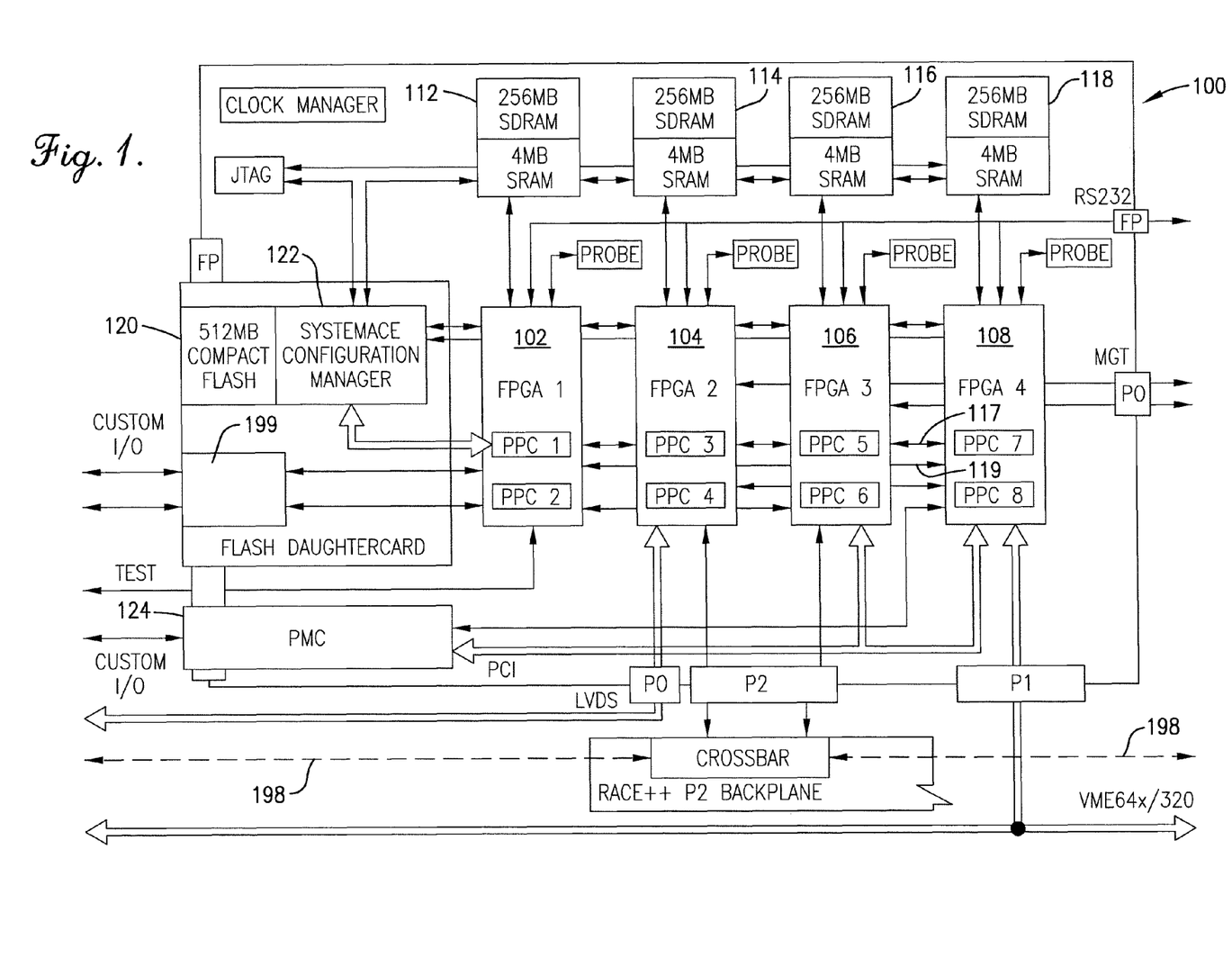
FIG. 1 illustrates a reconfigurable signal processing circuit according to one exemplary embodiment of the disclosed systems and methods.

FIG. 1 illustrates a reconfigurable signal processing circuit 100 as it may be configured on a single circuit card for reconfigurable signal processing and I/O applications according to one exemplary embodiment of the disclosed systems and methods. As shown in FIG. 1, multiple ASIC devices may be provided on a single circuit card, in this exemplary embodiment in the form of four FPGA devices 102, 104, 106 and 108. As will be described further herein, a packet router interface switch matrix ("PRISM") and a novel data packet creation system may be provided to route packets between FPGA devices 102, 104, 106, and 108, and other card-level and off-card devices and interfaces in a manner as will be described further herein. Additional details of PRISM and other aspects of the signal processing circuit 100 are disclosed in U.S. Pat. No. 7,444,454, which is hereby incorporated in its entirety into the present application by reference.

As illustrated in the figures herein, arrowhead notation is provided to indicate signal communication with a particular component. In this regard, an arrowhead that intersects a given device or component indicates signal communication to that given component in the direction indicated, while a line without an arrow head indicates that the line passes behind that component, i.e., without signal communication to the component. For example, in FIG. 1, duplex serial data communication link 117 is provided between FPGA devices 106 and 108, and duplex serial data communication link 119 is provided between FPGA devices 102 and 108.

In one exemplary embodiment, each of the FPGA devices 102, 104, 106 and 108 may be a Xilinx Virtex-II Pro® XC2VP50 FPGA device (available from Xilinx, Inc. of San Jose, Calif.), and FPGA devices 102, 104, 106 and 108 may be interconnected via high speed serial I/O connections in the form of multiple MGT that may be interconnected to form data communication links. In this regard, each XC2VP50 FPGA device features a massive programmable logic array, including over 50,000 flip-flops and their associated combinational logic. Additional embedded functions of Xilinx Virtex-II Pro® XC2VP50 FPGA devices include two PowerPC® 10 ("PPC") 405 cores, 232 18×18 multipliers, 4.2 Mb of RAM, 852 user-defined I/O pins, 16 MGTs, and digital clock management.

When implemented with four Xilinx Virtex-II Pro® XC2VP50 FPGA devices, signal processing circuit 100 of 15 FIG. 1 may be configured in one embodiment to accommodate board-level designs in the 15 to 20 million-gate range. However, although the signal processing circuit of FIG. 1 is described and illustrated with respect to one particular type of FPGA device, it will be understood that the disclosed systems and methods may be implemented with any other number and/or type/s of multiple ASIC devices that are suitable for card-level interconnection using serial I/O connections. Specific examples of other types of suitable ASIC devices include, but are not limited to, other Virtex-II Pro® devices, Altera Stratix GX® devices, other large FPGAs with high-speed serial I/O, custom ASIC devices with high-speed serial I/O, hardware modules using discrete high-speed serial I/O, etc. Further exemplary information on the use of MGT connections on PLD devices as may be employed in the practice of the disclosed systems and methods may be found in U.S. Pat. No. 6,617,877, which is incorporated herein by reference.

Still referring to FIG. 1, each FPGA device 102, 104, 106, and 108 may be configured to have access to respective dedicated memory resources 112, 114, 116, and 118 that may each include, for example, 256 MB of 266 MHZ DDR SDRAM and 4 MB of 100 MHz ZBT SRAM. As illustrated, a Compact Flash ("CF") module 120 may be provided for use as non-volatile storage of FPGA configuration data and software. In this regard, a 512 MB CF device may be configured in one exemplary embodiment to store up to 45 configurations for the four-FPGA array of FIG. 1, and an automated reconfiguration manager 122 (e.g., Xilinx System Ace®) may be provided to support JTAG communications between the multiple 45 FPGAs and full reconfiguration of the four-FPGA array, e.g., in under 5 seconds. In one exemplary embodiment, the illustrated signal processing circuit embodiment of FIG. 1 may be configured to offer a variety of standard interfaces, e.g., including VME64x, PCI, RACE++, parallel Rapid I/O, and high-speed serial standards based on MGTs. In this regard, MGT-based interfaces may include, for example, Fibrechannel, Serial Rapid I/O, XAUI (gigabit Ethernet), Infiniband, and Aurora. The exemplary signal processing circuit 100 of FIG. 1 may be provided with at least one PCI Mezzanine Card ("PMC") interface site 124 and/or other type/s of custom interface site/s (not shown) to interface with a wide variety of commercial off-the-shelf ("COTS") devices such as analog/digital converters ("ADCs"), high-speed I/O, and auxiliary processors/memory (e.g., RAM).

Also illustrated in the exemplary embodiment of FIG. 1 are VME card connector plug jacks (PO, PI, P2), front panel ("FP") connections, RACE interlink 198, and optional parallel I/O paths that may be provided for connection to analyzer probes for test purposes. A custom front panel interface may be provided using any suitable I/O methodology (e.g., MGT serial connection/s, etc.). It will be understood that the foregoing components and features are exemplary only, and that anyone or more of these components and/or features may be omitted, or that additional components and/or features may be present as so desired or needed to meet the requirements of a given application.

Figure 2:
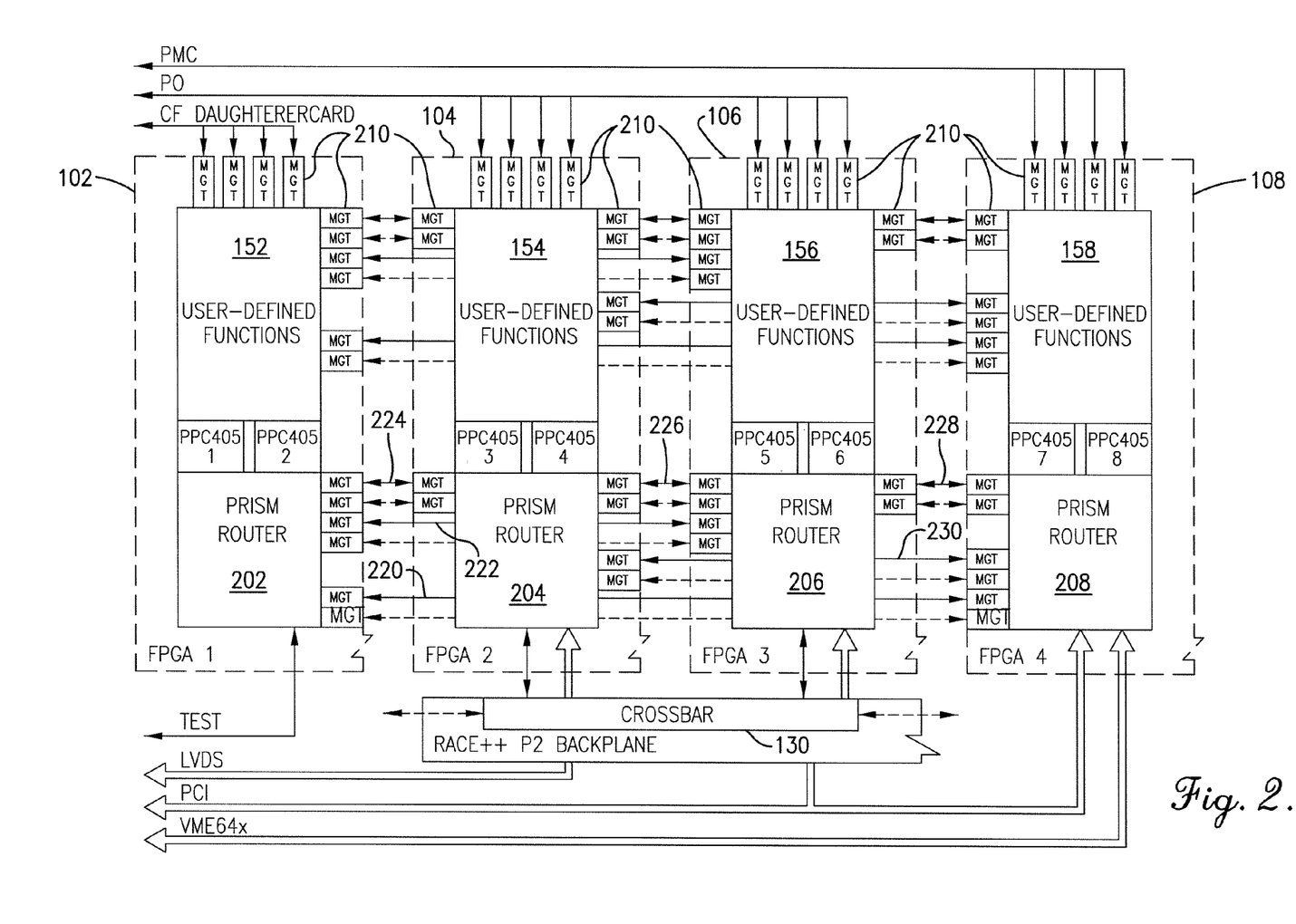
FIG. 2 illustrates a packet router interface switch matrix ("PRISM") communications infrastructure according to one exemplary embodiment of the disclosed systems and methods.

FIG. 2 illustrates one exemplary embodiment of a packet router interface switch matrix ("PRISM") communications infrastructure formed as a part of the RHA of reconfigurable signal processing circuitry 100 of FIG. 1, and as it may be implemented to interconnect multiple FPGAs 102, 104, 106 and 108 of the reconfigurable signal processing circuitry 100 10 of FIG. 1. As further illustrated in FIG. 2, in the PRISM infrastructure each FPGA 102, 104, 106 and 108 may be configured with a respective high-bandwidth crossbar router that operates at or near the data transfer bandwidth of the associated high speed interfaces (e.g., about 240 Mbytes or faster. In this regard, each of crossbar routers 202, 204, 206 and 208 may be provided for intra-FPGA communications, and may be provided with MGT connection cores 210 for inter-FPGA communications and communications with other devices.

As implemented in the exemplary embodiment of FIG. 2, the PRISM infrastructure may be configured to interconnect many of (or all) card-level interfaces, processor nodes, and/or user functions related to circuitry 100. In this regard, the PRISM infrastructure may be implemented to provide a useful basic communications framework that promotes commonality across many (or all) applications with little or no restriction to user utility. Further, the PRISM infrastructure may be implemented in a manner that does not preclude the addition of high-performance user connectivity, as it may be implemented to only use a portion of the available MGT and FPGA gate resources.

Still referring to the exemplary embodiment of FIG. 2, a PRISM infrastructure may be implemented in the framework code of each FPGA 102, 104, 106 and 108 in a manner that interconnects many (or all) card-level interfaces, processors, and user-defined functions of signal processing circuitry 100 via MGTs 210 and high-bandwidth packet routers 202, 204, 206 and 208. In this regard, packets may be transferred between PRISM ports in point-to-point fashion, and PRISM hardware may be configured to handle all the details of transmission, including arbitration of packet transfers with the same destination.

As shown by the double-arrowhead lines in FIG. 2, a packet router interface switch matrix ("PRISM") communications infrastructure may be configured so that one or more direct duplex data communication links exists between any given two ASIC devices, and in this exemplary embodiment between any two FPGAs of multiple FPGAs 102, 104, 106 and 108. For example, duplex data communication link 220 is shown provided between one MGT 210 of PRISM router 202 of FPGA 102 and one MGT 210 of PRISM router 208 of FPGA 108; duplex data communication link 222 is shown provided between one MGT 210 of PRISM router 202 of FPGA 102 and one MGT 210 of PRISM router 206 of FPGA 106; duplex data communication link 224 is shown provided between one MGT 210 of PRISM router 202 of FPGA 102 and one MGT 210 of PRISM router 204 of FPGA 104; duplex data communication link 226 is shown provided between one MGT 210 of PRISM router 204 of FPGA 104 and one MGT 210 of PRISM router 206 of FPGA 106; duplex data communication link 228 is shown provided between one MGT 210 of PRISM router 206 of FPGA 106 and one MGT 210 of PRISM router 208 of FPGA 108; and duplex data communication link 230 is shown provided between one MGT 210 of PRISM router 204 of FPGA 104 and one MGT 210 of PRISM router 208 of FPGA 108. One or more additional duplex data communication links may be optionally provided between respective MGTs 210 of two or more (e.g., between all) of the multiple FPGAs 102, 104, 106 and 108, as shown by the additional clotted and solid double-arrowhead lines in FIG. 2.

As further shown in FIG. 2, FPGAs 102, 104, 106 and 108 may be provided with MGTs 210 that form at least one duplex serial link between the User-Defined Functions (152, 154, 156, 158) of each FPGA pair, as well as MGTs 210 that form at least one duplex serial link between the PRISM routers (202, 204, 206, 208) of each FPGA pair, although it will be understood that it is not necessary for a given application that duplex serial links be provided between FPGA User-Defined Functions of given pair/s of FPGAs. Rather, the disclosed systems and methods may be implemented in one alternative embodiment by providing as few as one serial link (e.g., duplex serial link) between pairs of FPGA PRISM routers. It is also possible that one or more data communication link/s (e.g., duplex data communication links) may be provided between FPGA User-Defined Functions of a given pair/s of FPGAs (but not between FPGA PRISM routers), while at the same time one or more duplex data communication link/s may be provided between FPGA PRISM routers (but not FPGA User-Defined Functions) of another given pair/s of FPGAs. Thus, it will be understood that in the practice of the disclosed systems and methods that any FPGA function or embedded module/device on a given FPGA (or other type ASIC) may be linked to any FPGA function or embedded module/device (of the same or different type) on another FPGA (or other ASIC) using one or more serial data communication link/s (e.g., high speed I/O serial data communication links).

Figure 3:
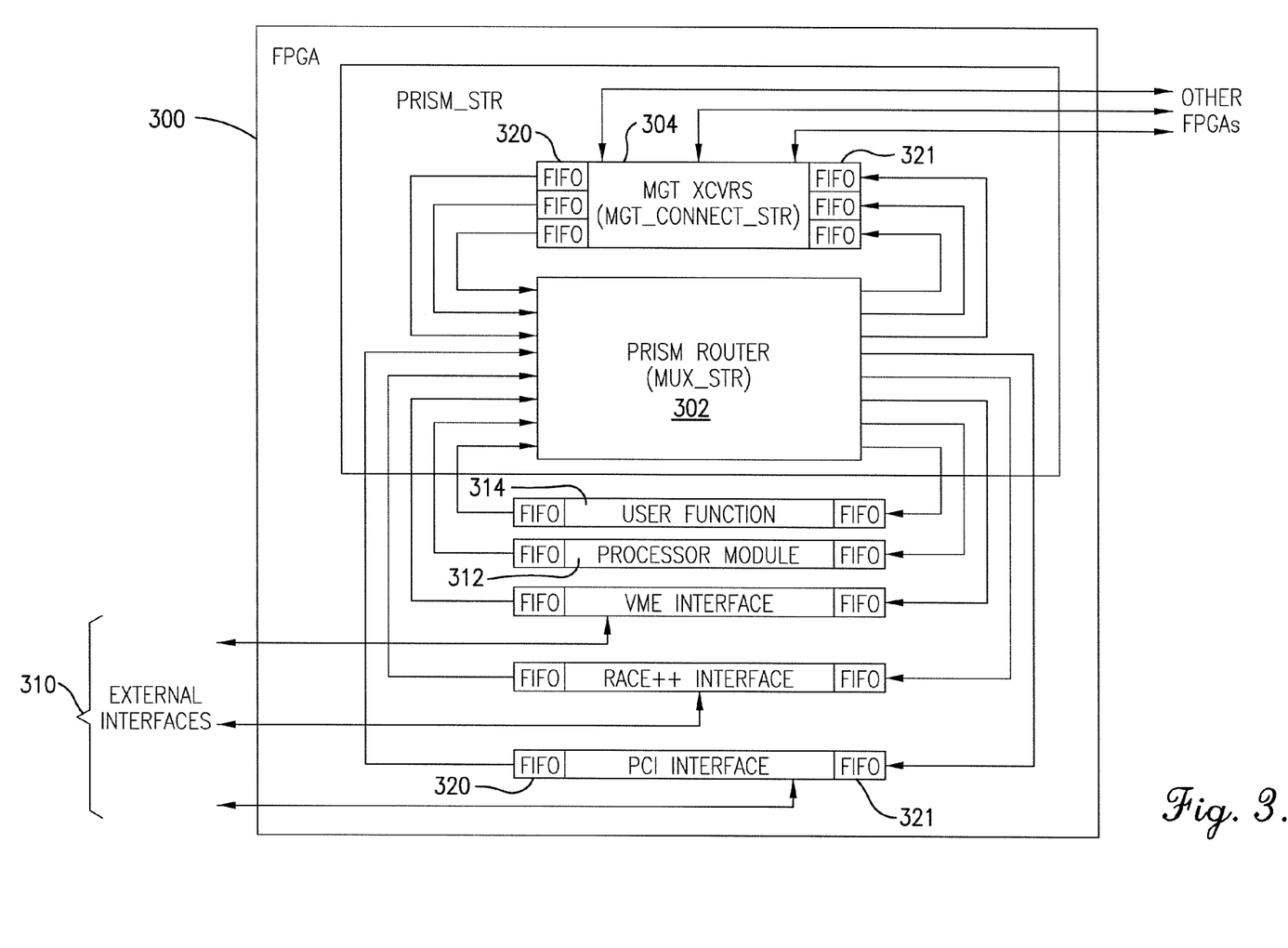
FIG. 3 illustrates a FPGA device that includes a PRISM router according to one exemplary embodiment of the disclosed systems and methods.

FIG. 3 illustrates one exemplary embodiment of a PRISM router configuration 302 that may be used to transfer data packets within a PRISM infrastructure to interconnect multiple ASIC devices, e.g., to interconnect multiple FPGAs 102, 104, 106 and 108 of the reconfigurable signal processing circuitry 100 of FIG. 1. As shown in FIG. 3, each ASIC device (e.g., FPGA 300 of an FPGA array or other configuration of multiple ASIC devices) may be configured to include a PRISM router 302 that interconnects its card-level interfaces 310, processor/s 312, user function/s 314, and inter-FPGA MGTs 304. As shown for the exemplary embodiment of FIG. 3, PRISM router 302 may be configured to connect to MGTs 304, card-level interface/s 310, processor/s 312, and/or user defined function/s 314 via source FIFO interfaces 320 and destination FIFO interfaces 321, and so that all PRISM interface ports share a similar structure. In this regard, PRISM router 302 may be configured to see read and write interface ports (e.g., router interface ports with MGTs 304, card-level interface/s 310, processor/s 312, user-defined function/s 314, etc.) as packet sources and destinations. In such an embodiment, interface modules may have source and destination FIFOs 320 and 321 mapped as slave functions, and users may read/write PRISM packets via these slave interfaces.

In one embodiment of the disclosed systems and methods, a PRISM routing scheme may be configured so that each pair of FPGAs on a given circuit card share a duplex data communication link, and so that no matter what its source is, a packet will cross no more than one duplex data communication link to reach any destination in the PRISM matrix. In this regard, a packet may be routed from a given source to a given destination using any methodology suitable for reading packets from a given PRISM router input or "reader" interface (e.g., from a source FIFO attached to a PRISM router input interface as illustrated in FIG. 3), and for writing the packets to a given PRISM router output or "writer" interface (e.g., to a destination FIFO attached to a PRISM router output interface). Thus, in one embodiment, a "reader interface" may be characterized as an interface used to read packets from a FIFO attached to a PRISM router input, and a "writer interface" may be characterized as an interface used to write packets to a FIFO attached to a PRISM router output. However, it will be understood that any other type of packet transmission (e.g., packet queuing and/or arbitration) techniques other than FIFO may be employed that is suitable for reading packets from a PRISM router input and/or writing packets to a PRISM router output. Examples of such alternative techniques include, but are not limited to, Dual-Port RAM, microprocessor-controlled RAM buffers, register banks, etc.

In accordance with an important aspect of the invention, each of the packet routers 202, 204, 206, 208 may include or be in communication with a data packet creation system that is configured to prepare and send data packets that are dynamically sized based on the amount of available data to be sent. The data packet creation system does not require a pre-set amount of data to be sent with each packet, but instead creates differently sized packets for different situations.

Figure 4:
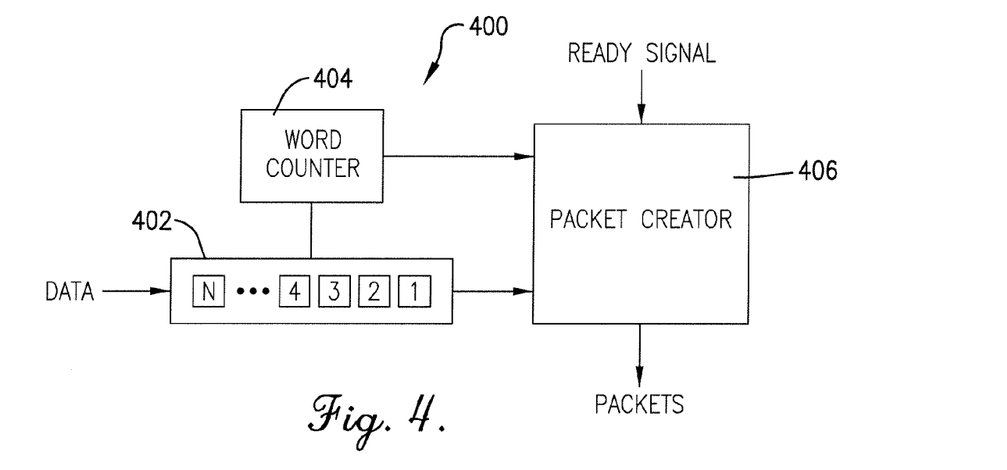
FIG. 4 illustrates a data packet creation system according to one exemplary embodiment of the disclosed systems and methods.

An exemplary embodiment of a data packet creation system 400 is illustrated in FIG. 4 and includes at least one data register 402, a word or data counter 404, and a packet creator 406. The functions of the data packet creation system 400 may be performed by or integrated with the PRISM routers 202, 204, 206, 208 or other components of the signal processing circuitry 100. In other embodiments, the data packet creation system includes separate components in communication with each of the PRISM routers. In either event, each PRISM router 202, 204, 206, 208 preferably includes or is in communication with its own separate data packet creation system.

The data register 402 may be a first-in-first-out (FIFO) register and may receive data from its ASIC or another ASIC. The data register 402 stores the data until the packet creator 406 is ready to load it into a data packet.

The word counter 404 may be a flip-flop or other register-type circuit and counts the amount of data in its respective data register 402 and provides the count to the packet creator 406. Although each data register preferably includes its own data counter as illustrated, any number of counters may be used.

The packet creator 406 may be any device capable of assembling data packets such as a state machine logic circuit. Each packet creator 406 receives data from its data register 402 and a word count from its data counter 404, creates a data packet, and sends the packet to its destination. Importantly, the packet creator 406 does not have to wait for a particular amount of data to create a data packet. Instead, as soon as the packet creator receives a signal from a destination router or other device that it is ready to receive data, the packet creator 406 takes the current word count from the word counter 404, adds it to a packet header, and then takes the words currently stored in the data register 402 and creates a data packet. The packet creator 406 also interacts with its PRISM router by waiting for a data ready signal, transmitting data acknowledgments back to PRISM, and coordinating other timing and synchronization tasks.

Figure 5:
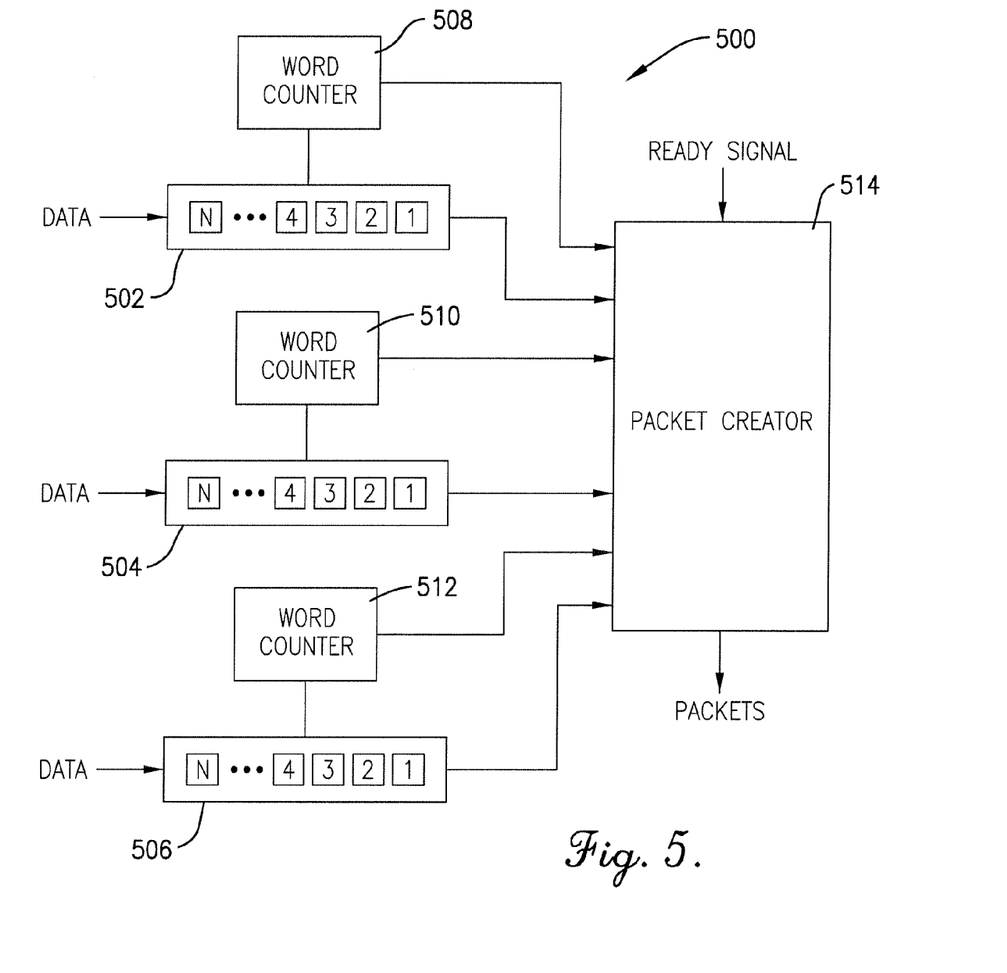
FIG. 5 illustrates a data packet creation system according to another exemplary embodiment of the disclosed systems and methods.

FIG. 5 illustrates a data packet creation system 500 in accordance with another embodiment of the invention in which several ASICs or other sources of data provide data to be routed by a single packet creator. Specifically, this embodiment of the packet creation system 500 includes a plurality of data registers 502, 504, 506, a word or data counter 508, 510, 512 for each data register, and a packet creator 514. As with the embodiment of FIG. 4, the functions of the data packet creation system 500 may be performed by or integrated with the PRISM routers 202, 204, 206, 208 or other components of the circuitry 100, or the data packet creation system 500 may include separate components in communication with each of the PRISM routers.

Each data register 502, 504, 506 may be a first-in-first-out (FIFO) register and may receive data from its ASIC or another ASIC. In one embodiment, each register is assigned to a particular destination device. For example, the illustrated packet creation system 500 may be integrated with or assigned to FGPA1 102, the data register 502 may be configured to store data destined for FPGA2 104, the data register 504 may be configured to store data destined for FPGA3 106, and the data register 506 may be configured to store data destined for FPGA4 108.

Each word counter 508, 510, 512 may be a flip-flop or other register-type circuit and counts the amount of data in its respective data register and provides the count to the packet creator 514. Each data register preferably includes its own data counter as illustrated.

As with the embodiment of FIG. 4, the packet creator 514 may be an FPGA based logic circuit device or any other device capable of assembling data packets. The packet creator 500 receives data from the data registers 502, 504, 506, receives the word counts from the data counters 508, 510, 512, creates data packets, and sends the packets to the destinations specified for each data register. The packet creator 514 may successively poll the data registers 502, 504, 506 to determine which of the registers has data ready to be sent.

After data is sent from one of the registers and the packet creator receives the ready signal, the packet creator may poll the next register.

As with the embodiment of FIG. 4, the packet creator 514 does not have to wait for a particular amount of data to create a data packet. Instead, as soon as the packet creator receives a signal from a destination router or other device that it is ready to receive data, the packet creator takes the current word count from a counter, adds it to a packet header, and then takes the words currently stored in the associated register and creates a data packet. The packet creator 514 also interacts with the PRISM router by waiting for a data ready signal and coordinating other timing and synchronization tasks.

Figure 6:
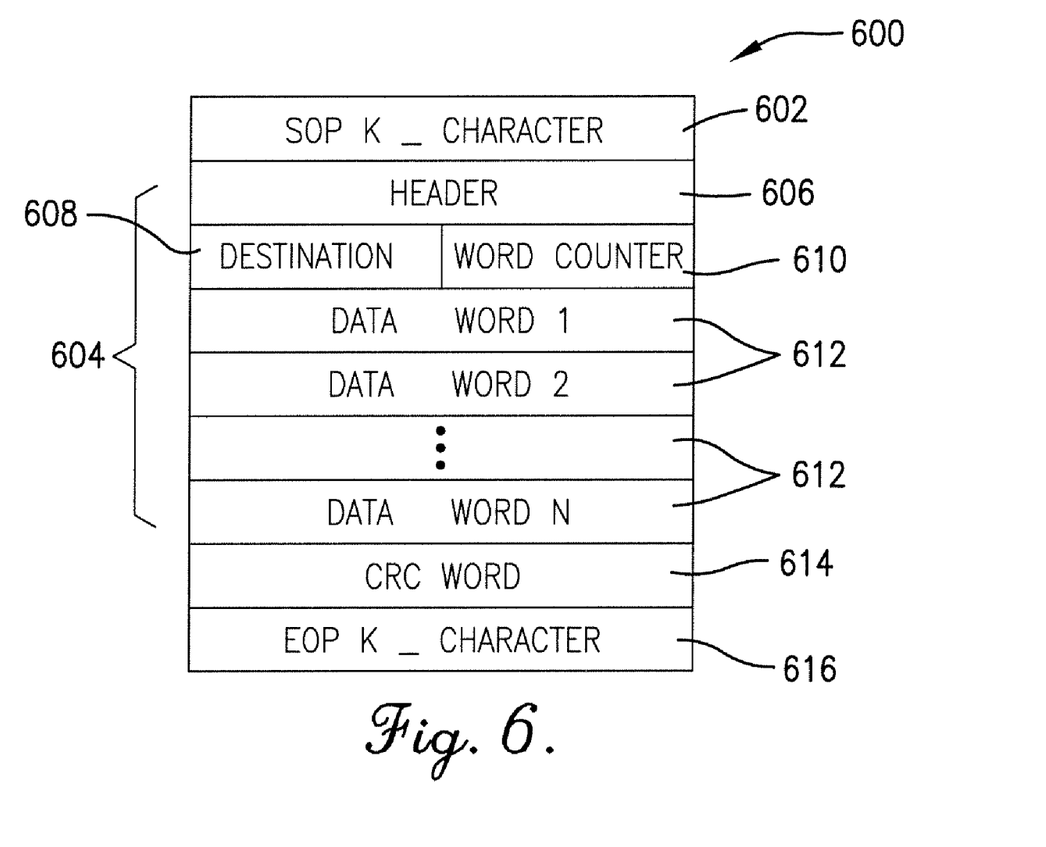
FIG. 6 illustrates a data packet according to one exemplary embodiment of the disclosed systems and methods.

FIG. 6 illustrates one exemplary embodiment of a data packet 600 that may be created with the data packet creation systems 400 or 500. Each packet 600 may include a start-of-packet K-character ("SOP K-Character") 602; a user packet 604 that includes a header 606, a destination address 608, a word counter 610, and a data payload 612 organized into a series of 32-bit words; a CRC word 614 to verify packet integrity at the receiver; and an end-of-packet K-character 616. In one embodiment, PRISM packets 600 may range in length from 4 to 511 words. The word counter may be a word in the header 606. The destination address 608 could specify one or multiple destinations. Although shown separately, the SOP K-character 602, the header 606, the destination 608, and the word counter 610 could all be encompassed in one header.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An application-specific integrated circuit (ASIC) array, comprising: three or more ASIC devices, each having at least a first serial connection and a second serial connection, wherein a first serial connection of a first one of the ASIC devices is coupled to a first serial connection on a second one of the ASIC devices to form a first serial data communication link, a second serial connection of the first one of the three or more ASIC devices is coupled to a first serial connection of a third one of the three or more other ASIC devices to form a second serial data communication link, and a second serial connection of the second one of the three or more ASIC devices is coupled to a second serial connection of the third one of the three or more ASIC devices to form a third serial data communication link; and a data packet creation system for transferring data packets between the ASIC devices over the first serial data communication link, the data packet creation system being configured to create a data packet with data from one of the ASIC devices and send it to a destination when it receives a data ready signal from the destination, wherein the data packet creation system is configured to create data packets of any size not limited by pre-selected size ranges and wherein a size of a data packet is solely determined by an amount of data received by the data packet creation system when it receives the data ready signal from the destination and is not dependent on pre-selected size ranges or any other factor.

2. The array of claim 1, further including a third ASIC device, wherein the first, second, and third ASIC devices each include a second serial connection, wherein a second serial connection of the first ASIC device is coupled to a first serial connection of the third ASIC device to form a second serial data communication link.

3. The array of claim 2, wherein a second serial connection of the second ASIC device is coupled to a second serial connection of the third ASIC device to form a third serial data communication link.

4. The array of claim 3, wherein each of the first, second and third serial data communication links comprise duplex serial data communication links.

5. The array of claim 4, wherein the three ASIC devices are configured to bi-directionally transfer data packets across each of the first, second and third duplex serial data communication links such that one data packet is transferred in whole by a given one of the first, second and third duplex serial data communication links during transfer of the data packet across the given one of the first, second and third duplex serial data communication links.

6. The array of claim 1, wherein each of the ASIC devices comprise field-programmable gate array (FPGA) devices; and wherein each of the serial connections comprises a multi-gigabit serial transceiver ("MGT") connection.

7. The array of claim 1, wherein each of the ASIC devices further comprises a packet router contained entirely within the respective ASIC device, the packet router having multiple reader interfaces configured as packet sources and multiple writer interfaces configured as packet destinations, at least one of the reader interfaces and at least one of the writer interfaces being coupled to each of the first and second serial connections of said respective ASIC wherein the packet router of each respective ASIC device is configured to process multiple simultaneous requests for transfer of data packets and to determine a destination of a first data packet from a routing code contained within a header of the first data packet and to transmit the first data packet from at least one of the writer interfaces of the packet router of each respective ASIC device to one of the first and second serial connections of the same respective ASIC device based on the destination determined from the routing code contained within the header of the first data packet.

8. The array of claim 1, wherein the array is configured for use as part of a signal processing circuit.

9. The array of claim 1, wherein the ASIC devices are coupled together on a single circuit card.

10. The array of claim 1, wherein the array comprises a part of a reconfigurable signal processing circuit.

11. An application-specific integrated circuit (ASIC) array, comprising:
three or more ASIC devices, each of the ASIC devices being a separate chip from the other of the three or more ASIC devices and having at least a first serial connection and a second serial connection, wherein a first serial connection of a first one of the three or more ASIC devices is coupled to a first serial connection on a second one of the ASIC devices with no other serial connection therebetween to form a first serial data communication link, wherein a second serial connection of the first one of the three or more ASIC devices is coupled to a first serial connection of a third one of the three or more other ASIC devices with no other serial connection therebetween to form a second serial data communication link, and wherein a second serial connection of the second one of the three or more ASIC devices is coupled to a second serial connection of the third one of the three or more ASIC devices with no other serial connection therebetween to form a third serial data communication link; and a data packet creation system for transferring data packets between the ASIC devices over the first, second, and third serial data communication links, the data packet creation system including:
- a data register for storing data from one of the ASIC devices,
- a data counter for counting the data in the data register,
- a packet creator operable to receive the data from the data register and a data count from the data counter and create a data packet therefrom when it receives a data request signal from a destination [regardless of the amount of the data in the data register], wherein the packet creator is configured to create data packets of any size not limited by pre-selected size ranges and wherein a size of a data packet is solely determined by an amount of data received by the packet creator when it receives the data ready signal from the destination and is not dependent on pre-selected size ranges or any other factor.

12. The array of claim 11, wherein each of the first, second and third serial data communication links comprise duplex serial data communication links.

13. The array of claim 12, wherein the three or more ASIC devices of the ASIC array are configured to bi-directionally transfer data packets across each of the first, second and third duplex serial data communication links such that one data packet is transferred in whole by a given one of the first, second and third duplex serial data communication links during transfer of the data packet across the given one of the first, second and third duplex serial data communication links.

14. The array of claim 11, wherein each of the ASIC devices comprise field-programmable gate array (FPGA) devices; and wherein each of the serial connections comprises a multi-gigabit serial transceiver ("MGT") connection.

15. The array of claim 11, wherein each of the respective three or more ASIC devices further comprises a packet router contained entirely within the respective ASIC device, the packet router having multiple reader interfaces configured as packet sources and multiple writer interfaces configured as packet destinations, at least one of the reader interfaces and at least one of the writer interfaces being coupled to each of the first and second serial connections of the respective ASIC wherein the packet router of each respective ASIC device is configured to process multiple simultaneous requests for transfer of data packets and to determine a destination of a first data packet from a routing code contained within a header of the first data packet and to transmit the first data packet from at least one of the writer interfaces of the packet router of each respective ASIC device to one of the first and second serial connections of the same respective ASIC device based on said destination determined from the routing code contained within the header of the first data packet.

16. The array of claim 11, wherein the array is configured for use as part of a signal processing circuit.

17. The array of claim 11, wherein the three or more ASIC devices are coupled together on a single circuit card.

18. The array of claim 17, wherein the array comprises a part of a reconfigurable signal processing circuit.

19. A method of routing data packets between three or more application-specific integrated circuit (ASIC) devices of an ASIC array that each comprise a first serial connection and a second serial connection, said method comprising:
- transferring at least one dynamically-sized data packet across a first serial data communication link formed between a first serial connection of a first one of said three or more ASIC devices and a first serial connection of a second one of said three or more ASIC devices with no other serial connection therebetween;
- transferring at least one dynamically-sized data packet across a second serial data communication link formed between a second serial connection of said first one of said three or more ASIC devices and a first serial connection of a third one of said three or more other ASIC devices with no other serial connection therebetween; and
- transferring at least one dynamically-sized data packet across a third serial data communication link formed between a second serial connection of said second one of said three or more ASIC devices and a second serial connection of said third one of said three or more ASIC devices with no other serial connection therebetween;
- wherein the dynamically-sized data packets are created and transferred when the ASIC devices receive data ready signals from one or more destination devices [regardless of an amount of the data in the packets] and wherein the data packets are of any size and not limited by pre-selected size ranges and wherein a size of a data packet is solely determined by an amount of data received when a data ready signal is received and is not dependent on pre-selected size ranges or any other factor.

20. The method of claim 19, wherein each of the first, second and third communication links comprise duplex data communication links.

21. The method of claim 19, wherein the method further comprises bi-directionally transferring data packets across each given one of the first, second and third duplex serial data communication links such that one data packet is transferred in whole by a given one of the duplex serial data communication links during the transfer of the data packet across said given one of the duplex serial data communication links.

22. The method of claim 19, wherein each of the three or more ASIC devices is a separate chip from the other of the three or more ASIC devices.

* * * * *